US008371748B2

(12) United States Patent
Yang

(10) Patent No.: US 8,371,748 B2
(45) Date of Patent: Feb. 12, 2013

(54) TEMPERATURE MEASURING APPARATUS

(75) Inventor: Ta Chieh Yang, New Taipei (TW)

(73) Assignee: Avita Corporation, New Taipei (TW)

( * ) Notice: Subject to any disclaimer, the term of this patent is extended or adjusted under 35 U.S.C. 154(b) by 4 days.

(21) Appl. No.: 13/157,299

(22) Filed: Jun. 9, 2011

(65) Prior Publication Data

US 2011/0305257 A1 Dec. 15, 2011

(30) Foreign Application Priority Data

Jun. 10, 2010 (TW) .............................. 99211078 U
Nov. 5, 2010 (CN) ...................... 2010 2 0592241 U

(51) Int. Cl.
*G01J 5/00* (2006.01)
(52) U.S. Cl. ....................................................... 374/121
(58) Field of Classification Search ................... 374/121
See application file for complete search history.

(56) References Cited

U.S. PATENT DOCUMENTS

| 5,487,607 | A | * | 1/1996 | Makita et al. ................. 374/158 |
| 6,149,297 | A | * | 11/2000 | Beerwerth et al. ............ 374/121 |
| 2004/0047392 | A1 | * | 3/2004 | Wu et al. ....................... 374/121 |
| 2011/0216806 | A1 | * | 9/2011 | Weng ............................. 374/128 |

* cited by examiner

*Primary Examiner* — Lisa Caputo
*Assistant Examiner* — Jamel Williams
(74) *Attorney, Agent, or Firm* — Raymond Y. Chan; David and Raymond Patent Firm

(57) ABSTRACT

A temperature measuring apparatus comprises a casing, an infrared sensor assembly, a probe, and a trigger device. The infrared sensor assembly is disposed in the casing. The trigger device is connected between the casing and the probe in such manner that when the probe moves toward the casing, the trigger device is activated by the probe to trigger the infrared sensor assembly to proceed sensing. The temperature measuring apparatus could be operated to measure without pressing any measuring button, so that the temperature measuring apparatus could have a stable operation in the measuring process. Hence, the error of the temperature measuring is reduced and the operation is more convenient.

14 Claims, 4 Drawing Sheets

TEMPERATURE MEASURING APPARATUS

BACKGROUND OF THE PRESENT INVENTION

1. Field of Invention

The present invention relates to a temperature measuring apparatus, and more particularly to an infrared temperature measuring apparatus.

2. Description of Related Arts

The conventional contact thermometer, such as the mercury-in-glass thermometer or the electrical resistance thermometer, should generally be contacted to the subject to be measured for a longer time for temperature measurement. However, due to the limitation of the contact area and the portion to be measured, the temperature measurement operation is relatively slow and inaccurate. Especially during the body temperature measurement of a baby, it is difficult to conduct a long time measuring. Such problems could be resolved if the infrared sensor would be adopted in the temperature measuring.

The subjects with different temperatures will respectively radiate infrared rays with different frequencies, so a device for receiving infrared rays could be used to detect the infrared rays in order to sense the temperature of a subject quickly. Conventionally, an infrared sensing device with a built-in infrared sensor, such as the infrared security device, the temperature sensor, the clinical thermometer, the forehead-temperature measuring gun, or the ear-temperature measuring gun, has already been used to detect the infrared ray of the subject for measuring the temperature of the subject.

Referring to FIG. 1, a conventional infrared ear-temperature measuring gun is illustrated. When the ear-temperature of a human body is measured, firstly, a power supply button (not shown in FIG. 1) must press down to activate the measuring gun entering into a stand-by mode. Then, insert the probe 11 of the ear-temperature measuring gun 1 into the human auditory canal E to be measured, and, subsequently, press down a measuring button 12 disposed on the casing to switch the measuring gun into a measuring mode for measurement. After a period of time, the ear-temperature measuring gun finishes the temperature measurement that the detected infrared ray energy is converted and calculated to obtain the body temperature of the human body, which is shown on a display unit provided on the casing.

However, when the above mentioned ear-temperature measuring gun 1 is used to measure temperature, since the measuring button 12 for triggering the measuring is disposed on the casing, it is difficult for the user to control when should be the right time to press down the measuring button 12. In addition, it is difficult for the user to operate and press down the measuring button 12 with his or her finger while aiming the ear-temperature measuring gun 1 at the auditory canal E, resulting in indirectly reducing the stability of the measuring procedure and adversely affecting the accuracy of the temperature measurement.

Hence, it is very important to provide an infrared temperature measuring apparatus with a maintainable stable operation, so as to reduce the error in the temperature measuring result and to render the operation more convenient.

SUMMARY OF THE PRESENT INVENTION

It will be appreciated that the present invention provides an infrared temperature measuring apparatus which can be operated to measure temperature without utilizing any measuring button so as to maintain an operation stability of the apparatus, reduce the error of the temperature measuring result and render the temperature measuring operation being more convenient.

The present invention provides a temperature measuring apparatus, which comprises:
  a casing;
  a probe;
  an infrared sensor disposed in the casing; and
  a trigger device connecting the casing with the probe in such manner that when the probe moves toward the casing, the trigger device is activated to trigger the infrared sensor assembly to proceed sensing.

In a preferred embodiment of the present invention, the trigger device comprises a spring element or a push-button element.

In a preferred embodiment of the present invention, the probe is arranged corresponding to the infrared sensor assembly or is connected to the infrared sensor assembly.

In a preferred embodiment of the present invention, the temperature measuring apparatus further comprises a control circuit, which is disposed in the casing and electrically connected with the infrared sensor.

In a preferred embodiment of the present invention, the temperature measuring apparatus further comprises a information unit, which is electrically connected with the control circuit.

In a preferred embodiment of the present invention, the trigger device comprises a switch for transmitting a signal of the infrared sensor assembly to the control circuit when it is conducted by the movement of the trigger device.

In a preferred embodiment of the present invention, the trigger device comprises a switch for driving the control circuit to convert a signal of the infrared sensor assembly when it is conducted by the movement of the trigger device.

In a preferred embodiment of the present invention, the trigger device is moved to push the infrared sensor assembly to be electrically connected with the control circuit.

In a preferred embodiment of the present invention, the temperature measuring apparatus further comprises a display unit, which is provided on the casing and electrically connected with the control circuit to be controlled by the control circuit to display temperature data according to a signal of the infrared sensor assembly.

In a preferred embodiment of the present invention, the temperature measuring apparatus further comprises a mode switching component, which is provided on the casing and electrically connected with the control circuit for switching the control circuit to different measuring modes.

Accordingly, the trigger device of the temperature measuring apparatus according to a preferred embodiment of the present invention is arranged corresponding with the probe thereof and the trigger device connects the casing with the probe. Therefore, when the probe moves toward the casing, the trigger device is activated to trigger the infrared sensor assembly to proceed sensing. Hence, the user can operate temperature sensing measurement simply by means of the triggering of the trigger device, resulting that the stability of the temperature measuring operation can be maintained without the need and operation of any measuring button.

These and other objectives, features, and advantages of the present invention will become apparent from the following detailed description, the accompanying drawings, and the appended claims.

DETAILED DESCRIPTION OF THE PREFERRED EMBODIMENT

Figure 1:
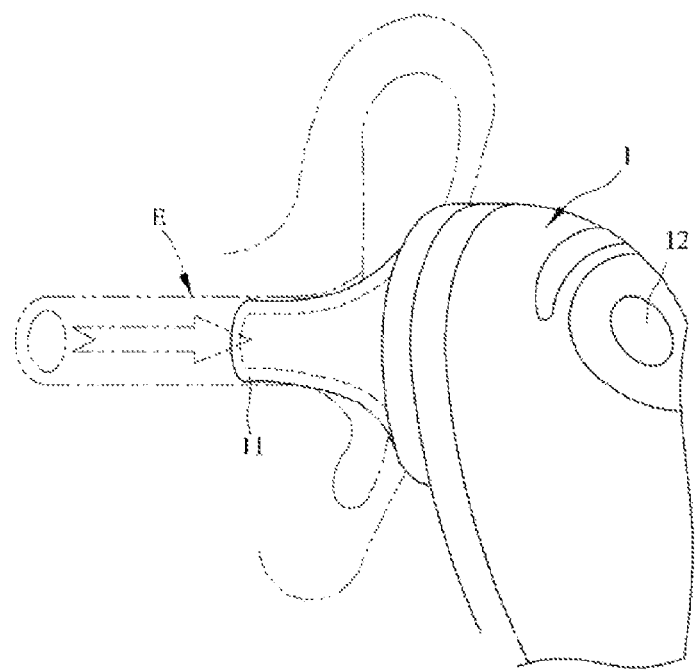
FIG. 1 is a schematic view of a conventional infrared ear-temperature measuring gun in a measuring mode.
Figure 2A:
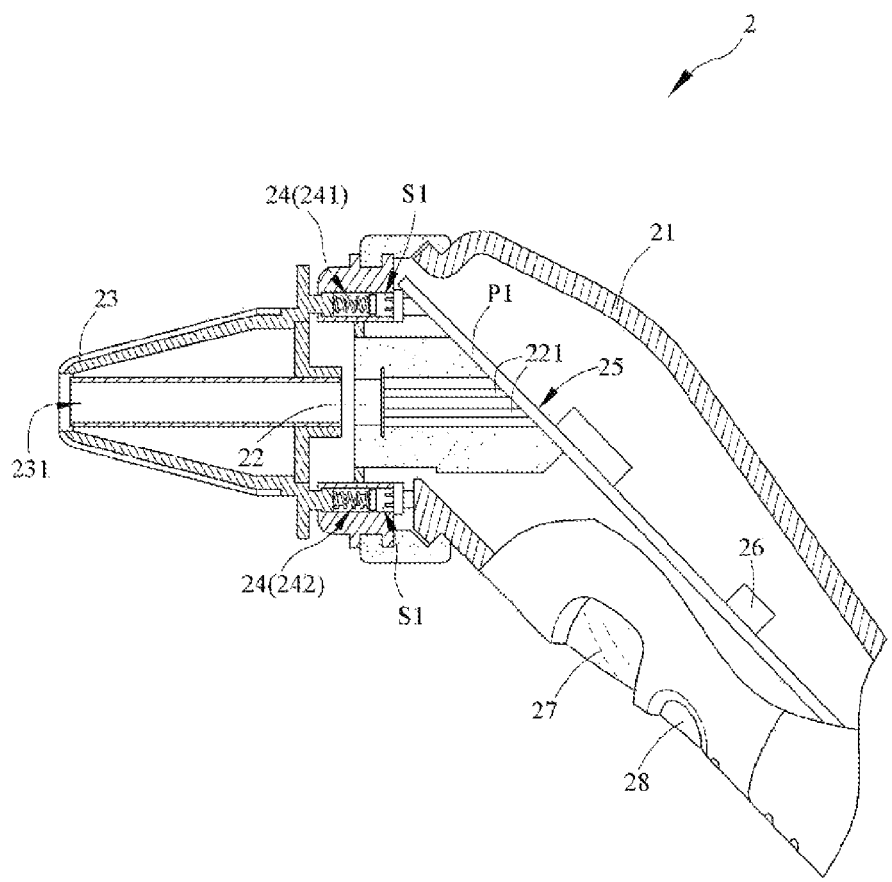
FIG. 2A is a sectional view of a temperature measuring apparatus according to a first preferred embodiment of the present invention, wherein the temperature measuring apparatus is in an un-measuring mode.
Figure 2B:
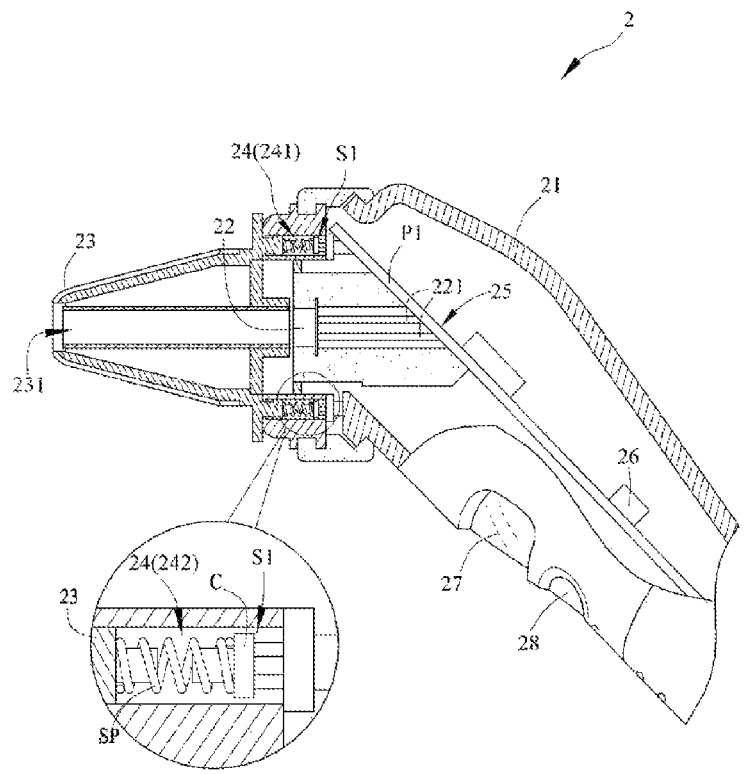
FIG. 2B is a sectional view of the temperature measuring apparatus according to the above first preferred embodiment of the present invention, wherein the temperature measuring apparatus is in a measuring mode.
Figure 2C:
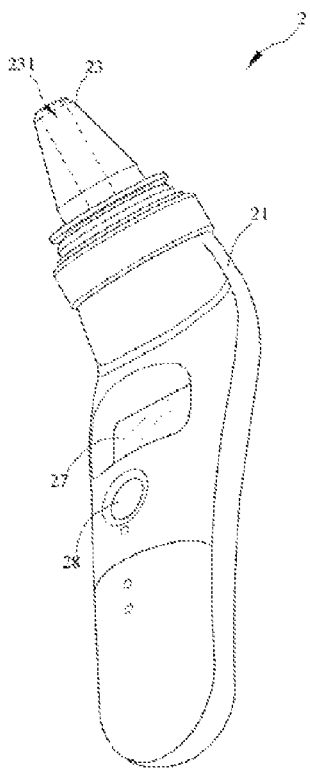
FIG. 2C is a perspective view of the temperature measuring apparatus according to the above first preferred embodiment of the present invention.

Referring to FIGS. 2A, 2B and 2C, FIG. 2A and FIG. 2B are sectional views of a temperature measuring apparatus according to a first preferred embodiment of the present invention, and FIG. 2C is a perspective view of the temperature measuring apparatus. FIG. 2A is a sectional view illustrates the temperature measuring apparatus during an un-measuring mode, while FIG. 2B illustrates the temperature measuring apparatus with the probe being pushed to a measuring mode.

The temperature measuring apparatus 2 comprises a casing 21, an infrared sensor assembly 22, a probe 23 and a trigger device 24. The temperature measuring apparatus 2 is an infrared temperature measuring apparatus, which could be structurally designed for measuring temperatures of different portions with different structures and names, such as, but not limited to, ear-temperature measuring gun, forehead-temperature measuring gun or forehead and ear temperature measuring gun.

The infrared sensor assembly 22 is disposed in the casing 21 and the probe 23 is disposed correspondingly to the infrared sensor assembly 22. In the present invention, the casing 21 is also functioned as a handle of the temperature measuring apparatus 2. In the first preferred embodiment, the probe 23 has a through-hole 231, which is disposed corresponding to the infrared sensor assembly 22 so as to permit the infrared ray to be sensed by the infrared sensor assembly 22 to enter into the through-hole 231.

The trigger device 24 is connected between the casing 21 and the probe 23. Alternatively, the casing 21 may be constructed by a plurality of sub-casings, wherein sub-casing to be handled by the user might be different from the sub-casing connected with the trigger device 24. During operation, the head portion of the probe 23 contacts with a portion of the user to be measured, such as the ear. Then, when the user presses the probe 23 to force the probe to move toward the casing 21, the probe 23 drives and activates the trigger device 24 to trigger the infrared sensor assembly 22 to proceed sensing. The trigger device 24 is connected to an inner portion of the probe 23 or connected to a side portion adjacent to the casing 21 of the probe 23. According to the preferred embodiment, taking the structure that the trigger device 24 is connected to a side portion of the probe 23 as example, the trigger device 24 includes, but not limited to, an elastic element or a push-button unit. In this embodiment, the trigger device 24 comprises two push-button units 241, 242 respectively connected with the casing 21 and the probe 23.

Referring to FIG. 2B, an enlarged view of the push-button unit is illustrated. Each of the push-button units 241, 242 has a spring SP and a switch S1 with two electric conduction portions, wherein the two electric conduction portions are being not conducted electrically during the un-measuring mode, and that the spring SP has one end connected with the probe 23 and the other end connected with a conduction element C. Therefore, when the probe 23 is pressed against the measuring subject by the user to move the probe 23 toward the casing 21 that the probe 23 forces the springs SP of the push-button units 241, 242 and the conduction elements C to move toward the casing 21 until the two conduction elements C are both contacted with the two electric conduction portions, the switch S1 is electrically switched on. It is worth to mentioning that the switch S1 could be designed to be switched on when one of the conduction elements C of the push-button units 241, 242 is contacted with the respective electric conduction portion so as to increase the sensitivity of the measurement.

The temperature measuring apparatus 2 further comprises a control circuit 25 disposed in the casing 21. According to the preferred embodiment of the present invention, the control circuit 25 is disposed in the casing 21 and a circuit board P1 is provided in the casing 21, wherein the infrared sensor assembly 22 is electrically connected with the control circuit 25 through a connecting terminal 221.

The temperature measuring apparatus 2 further comprises a information unit 26 electrically connected with the control circuit 25. The information unit 26 is disposed in the casing 21 and positioned on the circuit board P1 of the control circuit 25. The information unit 26 could be a sound generating unit, such as a buzzer, or an illuminating unit. Taking the buzzer as an example in the preferred embodiment, the prompt is used for reminding the user of the operating situation of the temperature measuring apparatus 2. For example, when the main power supply of the temperature measuring apparatus 2 is turned on, the information unit 26 will send an informing message to inform the user that the main power supply is turned on. Alternatively, when the temperature measuring apparatus 2 starts the measuring, the information unit 26 will send another informing message to inform the user that the temperature measuring apparatus 2 begins to measure temperature. Alternatively, when the temperature measuring apparatus 2 finishes the measurement, the information unit 26 will send another informing message to inform the user that the measurement is completed. Accordingly, different informing messages can be designed to satisfy different operating requirements. It is obvious that the temperature measuring apparatus 2 could be designed to provide all the informing messages mentioned above. In this embodiment, it is preferred that when the temperature measuring apparatus 2 finishes the measurement, the information unit 26 will send a informing sound via the buzzer.

Furthermore, the temperature measuring apparatus 2 further comprises a display unit 27 disposed on the casing 21 and electrically connected to the control circuit 25. The control circuit 25 converts and calculates the energy of the infrared ray to obtain a relative temperature, and then the control circuit 25 controls the display unit 27 to show this temperature.

Furthermore, the temperature measuring apparatus 2 further comprises a mode switching component 28, such as a button. The mode switching component 28 is provided on the casing 21 and is electrically connected with the control circuit 25. The control circuit 25 could be operated in different measuring modes by switching the control of the mode switching component 28. For example, when the temperature measuring apparatus is in the ear-temperature measuring mode, if the user presses the mode switching component 28, the mode will be switched into the forehead-temperature measuring mode. Additionally, the mode switching component 28 could be integrated with the trigger device 24 that when the trigger device 24 could be pressed for switching the measuring modes. For example, when the trigger device 24 is pressed twice, the measuring mode changes.

Referring to FIG. 2A and FIG. 2B, the operation of the temperature measuring apparatus 2 is illustrated.

When the user turns on the main power supply and presses the probe 23 against a subject to be measured, such as the auditory canal of the human body, the probe 23 is pushed by the subject to be measured to move toward the casing 21 due to the reaction force from the subject, so as to electrically switch on the switch S1 through the movement of the trigger device 24 (the push-button units 241, 242). When the switch S1 is switched on, the infrared sensor assembly 22 receives the infrared ray and generates a signal which is transmitted to the control circuit 25 through the switch S1 and converted by the control circuit 25 to calculate out a measured temperature and display on the display unit 27. At the same time, the control circuit 25 also controls the information unit 26 to send out an informing message that the measurement is completed.

Alternatively, when the switch S1 has not been switched on, the control circuit 25 has received the signal of the infrared sensor assembly 22 but not being converted and calculated yet. After the switch S1 is switched on, the control circuit 25 does calculate and convert the received signal of the infrared sensor assembly 22 to display the measured temperature data on the display unit 27. At the same time, the control circuit 25 also controls the information unit 26 to send out an informing message that the measurement is completed.

It is worth mentioning that, when the trigger device 24 is moved to switch on the switch S1, it drives the control circuit 25 to process calculation and conversion, and then the control circuit 25 controls the display unit 27 to display the measured temperature. Hence, the user can complete the operation of the temperature measuring apparatus 2 to measure the temperate without continuously applying pressure against the probe 23. Of course, the temperature measuring apparatus 2 can has an alternative design, which requires to be equipped with another kind of control circuit, that the probe 23 needs to be continuously pressed until the measurement is completed, wherein, in addition, when the user stops the continuous pressing of the probe 23, the spring SP will draw the probe 23 back to the un-measuring position to switch off the switch S1.

Figure 3:
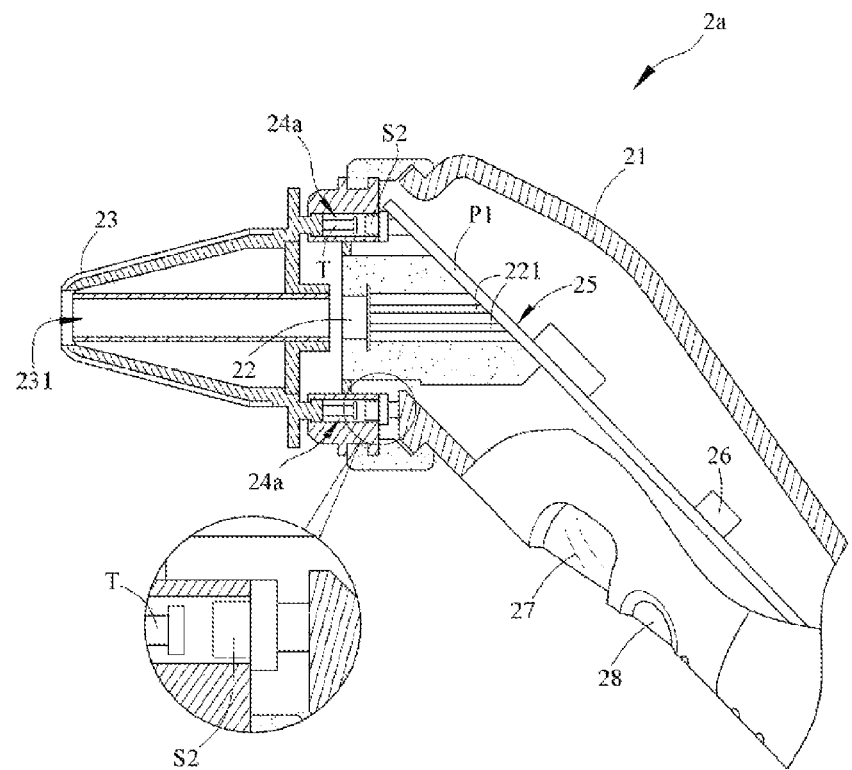
FIG. 3 is a sectional view illustrating an alternative mode of the temperature measuring apparatus according to the above first preferred embodiment of the present invention.

Referring to FIG. 3, an alternative mode of the temperature measuring apparatus according to the first preferred embodiment is illustrated.

The temperature measuring apparatus 2a as shown in FIG. 3 and the temperature measuring apparatus 2 are different in that the trigger device 24a has a push-button unit with a push rod T. In this embodiment, the push-button unit could be designed as a push-push type button, that is a button that can lock the connecting point simply by one single push. When the user pushes the probe 23 of the temperature measuring apparatus 2a to force the probe 23 to move toward the casing 21, the probe 23 directly drives the push rod T of the trigger device 24a to move toward the casing 21 to further trigger the button switch S2 disposed on the casing 21 or the circuit board P1 to switch on the button switch S2. When the measurement is finished, simply by pushing the probe 23 to drive the push rod T once, the button switch S2 is switched off for the next measurement.

Figure 4:
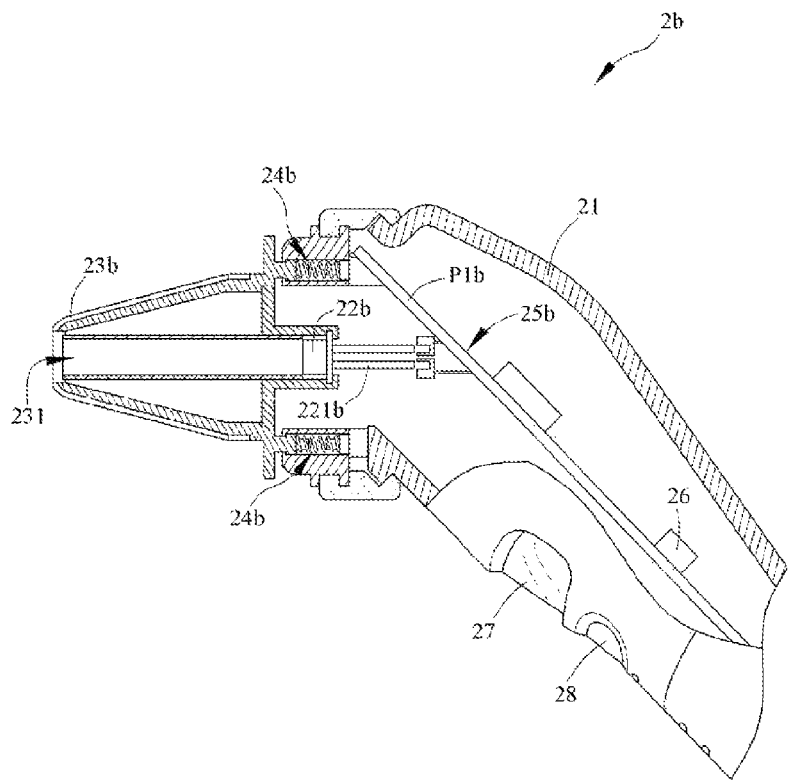
FIG. 4 is a sectional view illustrating another alternative mode of temperature measuring apparatus according to the above first preferred embodiment of the present invention.

Referring to FIG. 4, another alternative mode of the temperature measuring apparatus according to the first preferred embodiment is illustrated.

The temperature measuring apparatus 2b as shown in FIG. 4 and the temperature measuring apparatus 2 are different in that the infrared sensor assembly 22b of the temperature measuring apparatus 2b is connected with the probe 23b, but not directly connected with the control circuit 25b. Hence, when the probe 23b moves toward the casing 21, the trigger device 24b moves to push the infrared sensor assembly 22b toward the control circuit 25b resulting that the connecting terminal 221b of the infrared sensor assembly 22b is electrically connected with control circuit 25b. Thereby the control circuit 25b is capable of receiving the signal of the infrared sensor assembly 22b, and then converting the signal to calculate out a temperature for being displayed on the display unit 27. At the same time, the control circuit 25b also controls the information unit 26 to send out an informing message that the measurement is completed.

It is worth mentioning that, if the trigger device 24b of the temperature measuring apparatus 2b as shown in FIG. 4 adopts a general push-button unit, the probe 23b must be continuously pressed to keep the signal of the infrared sensor assembly 22b being continuously transmitted to the control circuit 25b until the informing message that the measurement is completed appears. If the trigger device 24b adopts the push-push type button of the temperature measuring apparatus 2a, the trigger device 24b is required to be pushed once and then to be pushed again after the informing message of the temperature measuring apparatus that the measurement is completed appears. Hence, it is unnecessary to continuously press the probe 23b.

Figure 5:
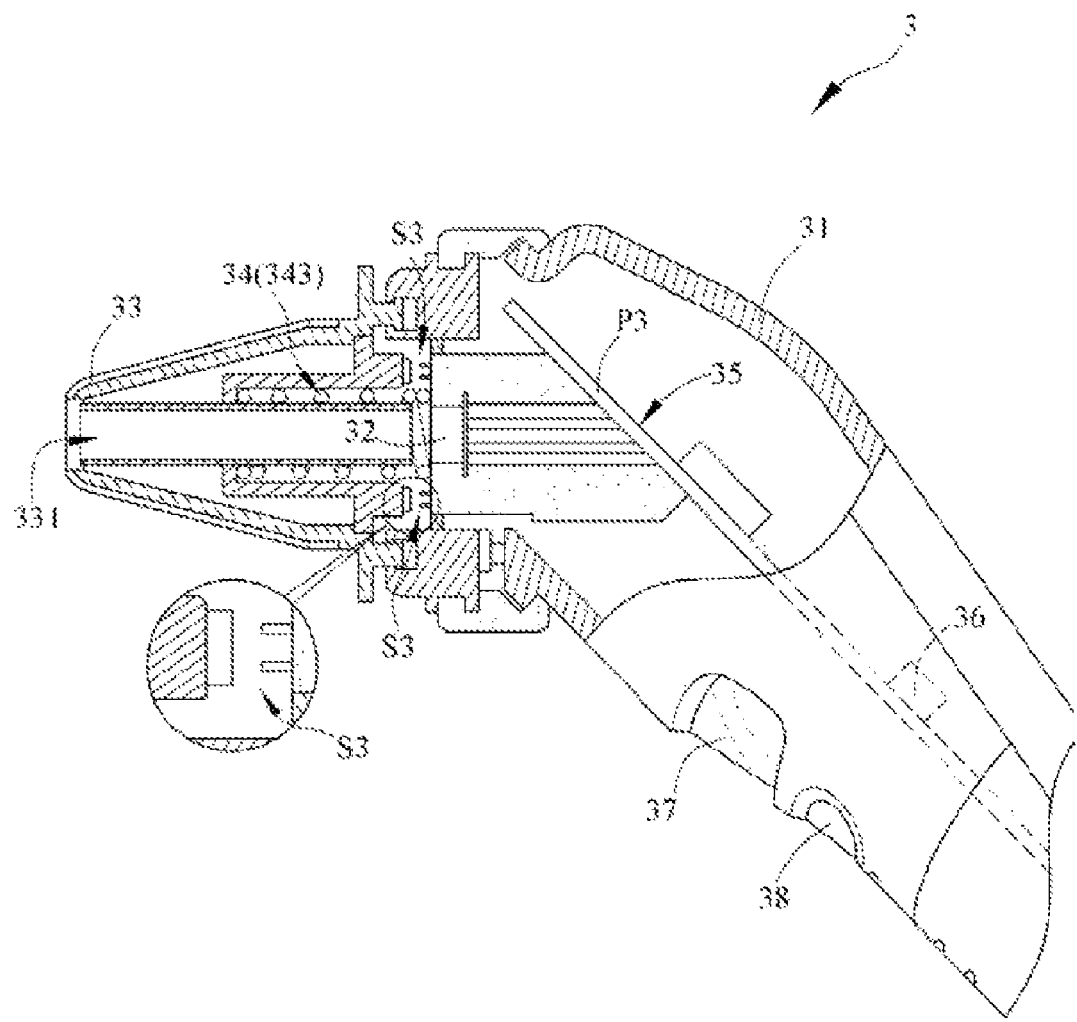
FIG. 5 is a sectional view of a temperature measuring apparatus according to a second preferred embodiment of the present invention.

Furthermore, referring to FIG. 5, a temperature measuring apparatus 3 according to a second preferred embodiment is illustrated.

The temperature measuring apparatus 3 comprises a casing 31, an infrared sensor assembly 32, a probe 33, and a trigger device 34. The infrared sensor assembly 32 is disposed in the casing 31. The probe 33 is arranged corresponding with the infrared sensor assembly 32. The trigger device 34 is connected between the casing 31 and the probe 33 in such manner that when the probe 33 is moved toward the casing 31, the trigger device 34 is activated by the probe 22 to trigger the infrared sensor assembly 32 to proceed sensing.

The temperature measuring apparatus 3 further comprises a control circuit 35 disposed in the casing 31 and electrically connected with the infrared sensor assembly 32. The temperature measuring apparatus 3 further comprises an information unit 36 electrically connected with the control circuit 35. The temperature measuring apparatus 3 further comprises a display unit 37 provided on the casing 31 and electrically connected with the control circuit 35. The display unit 37 is controlled by the control circuit 35 to display temperature data according to the energy of the infrared ray received in the infrared sensor assembly 32.

The temperature measuring apparatus 3 further comprises a mode switching component 38 provided on the casing 31 and electrically connected with the control circuit 35 for switching the control circuit 35 in different measuring modes.

In the second preferred embodiment, the trigger device 34 further comprises an elastic component 343 connecting the probe 33 with the casing 31. Here, the elastic component 343 is arranged surrounding the outside of a through hole 331 and is connected with the casing 31 and the probe 33 respectively. The infrared sensor assembly 32 receives the infrared ray and generates a signal, then the elastic component 343 of the trigger device 34 moves to switch on the switch S3, so as to activate the control circuit 35 to convert the signal and to calculate out a temperature to be displayed on the display unit 37. At the same time, the control circuit 35 also controls the information unit 36 to send out an informing message that the measurement is completed. When the user does not continuously press the probe 33, the elastic component 343 will drive the probe 33 back to the un-measuring position and to switch off the switch S2.

Hence, according to the embodiments mentioned above, the trigger device could be designed to drive the temperature measuring apparatus to begin the measuring without pressing any measuring button.

In view of the temperature measuring apparatus of the present invention, the probe is arranged corresponding to the infrared sensor assembly, and the trigger device is connected between the casing and the probe in such manner that when the probe is moved toward the casing, the trigger device is activated by the probe to trigger the infrared sensor assembly to proceed sensing. Hence, the temperature measuring apparatus not only could have a stable operation in the measuring process, but also could proceed measuring without pressing any measuring button, so as to accurately control the trigger time and the finish time of the measurement.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A temperature measuring apparatus, comprising:
a casing;
a probe;
an infrared sensor assembly disposed in said casing; and
a trigger device connecting said casing with said probe in such manner that when said probe moves toward said casing, said trigger device is activated by said probe to trigger said infrared sensor assembly to proceed sensing.

2. The temperature measuring apparatus, as recited in claim 1, wherein said trigger device comprises a spring element.

3. The temperature measuring apparatus, as recited in claim 1, wherein said trigger device comprises a push-button element.

4. The temperature measuring apparatus, as recited in claim 1, wherein said probe is arranged corresponding to said infrared sensor assembly.

5. The temperature measuring apparatus, as recited in claim 1, wherein said probe is connected to said infrared sensor assembly.

6. The temperature measuring apparatus, as recited in claim 1, further comprising a control circuit disposed in said casing and electrically connected with said infrared sensor assembly.

7. The temperature measuring apparatus, as recited in claim 6, further comprising an information unit electrically connected with said control circuit.

8. The temperature measuring apparatus, as recited in claim 6, wherein said trigger device comprises a switch which is able to be switched on by a movement of said trigger device for transmitting a signal of said infrared sensor assembly to said control circuit.

9. The temperature measuring apparatus, as recited in claim 6, wherein said trigger comprises a switch which is able to be switch by a movement of said trigger device for driving said control circuit to convert a signal of said infrared sensor assembly.

10. The temperature measuring apparatus, as recited in claim 6, wherein said trigger device is able to move to push said infrared sensor assembly to be electrically connected with said control circuit.

11. The temperature measuring apparatus, as recited in claim 6, further comprising a display unit, which is provided on said casing and electrically connected with said control circuit to be controlled by said control circuit to display temperature data according to a signal of said infrared sensor assembly.

12. The temperature measuring apparatus, as recited in claim 6, further comprising a mode switching component, which is provided on said casing and electrically connected with said control circuit to switch said control circuit in different measuring modes.

13. The temperature measuring apparatus, as recited in claim 1, wherein said trigger device is disposed in said probe.

14. The temperature measuring apparatus, as recited in claim 1, wherein said trigger device is disposed on a side of said probe.

* * * * *